United States Patent [19]

Tsunefuji et al.

[11] 4,231,644
[45] Nov. 4, 1980

[54] ELECTRICAL SHUTTER FOR CAMERA

[75] Inventors: Katsuhiko Tsunefuji; Isao Kondo, both of Hachioji, Japan

[73] Assignee: Olympus Optical Co., Ltd., Tokyo, Japan

[21] Appl. No.: 934,084

[22] Filed: Aug. 16, 1978

[30] Foreign Application Priority Data

Sep. 30, 1977 [JP] Japan ................................ 52-117649
Sep. 30, 1977 [JP] Japan ................................ 52-117650

[51] Int. Cl.³ .......................... G03B 7/083; G03B 9/58
[52] U.S. Cl. ........................................ 354/51; 354/234
[58] Field of Search ............... 354/50, 51, 60 R, 60 E, 354/60 L, 234, 235, 266

[56] References Cited

U.S. PATENT DOCUMENTS

| 3,641,902 | 2/1972 | Kikiechi et al. | 354/234 X |
| 3,768,390 | 10/1973 | Kobori | 354/235 X |
| 4,106,040 | 8/1978 | Ito et al. | 354/234 X |

Primary Examiner—Michael L. Gellner
Attorney, Agent, or Firm—Weinstein & Sutton

[57] ABSTRACT

An electrical shutter comprises a first detent member which maintains a shutter drive member at its start position, and a second detent member which maintains a shutter in its open position. Upon abutment of the shutter drive member, both the first and second detent members are urged to move in a direction away from the drive member in response to the rotating force of the shutter drive member. The shutter also includes electrical circuits for accessory features which are connected through normally open switches with the common bus of the power source.

17 Claims, 13 Drawing Figures

ELECTRICAL SHUTTER FOR CAMERA

BACKGROUND OF THE INVENTION

The invention relates to an electrical shutter for a camera, and more particularly, to an electrical shutter of electromagnetic release type in which shutter blades are operated for opening and closing by the resilience of a prime mover spring which is disposed on a single shaft.

An electrical shutter of electromagnetic release type is already known in which a prime mover spring disposed on a single shaft is charged in response to a film winding operation and is released in response to an electromagnetic release to drive a shutter drive member for rotation in order to operate shutter blades and wherein the rotation of the drive member is controlled by a detent member which is constrained by an electromagnet or the like in order to determine the length of an exposure period. Such electrical shutter is simple in construction and provides an automatic stop of the film winding for each picture frame. Additionally, it is constructed so as to prevent a double exposure.

A shutter mechanism of the single shaft rotating type is typically constructed in the manner as shown in FIG. 1. Referring to this Figure, shutter drive member 101 in the form of a disc is fixedly mounted on a single, rotatable shaft 102 on which a prime mover spring 103 is disposed. One end 103a of spring 103 is secured to the drive member 101 and its other end 103b is fixedly connected with a charging member 110 which rotates in association with a film winding operation. The spring 103 is charged in response to a film winding operation, whereby the drive member 101 is urged to rotate counter-clockwise, as indicated by an arrow. Before the shutter is operated, the resulting rotation of the drive member 101 is blocked by the abutment of an arm 101a extending from the drive member 101 against a detent member 105 which is rockably mounted on a stud 104. In this manner, the drive member 101 is maintained in its start position for performing a shutter operation.

Another detent member 106 has its own arm 106a located in the path of rotation of the arm 101a. The detent member 106 is pivotally mounted on a stud 107 and is urged by spring 108 to rotate counter-clockwise about stud 107. An armature piece 106b is formed on the end of the other arm and is held in abutment against an electromagnet 109.

In operation, when detent member 105 is moved out of abutting engagement with the arm 101a in response to shutter release, the drive member 101 rotates counter-clockwise under the resilience of spring 103 to open the shutter. In the fully open position of the shutter, arm 101a abuts against arm 106a of the other detent member 106, thus temporarily maintaining the shutter fully open. At this time, electromagnet 109 holds detent member 106 attracted thereto. When a proper exposure has been given, the electromagnet 109 is deenergized to permit the drive member 101 to rock the detent means 106 so as to move past it, thus undergoing a remaining one-half revolution about the shaft 102 until it returns to its start position, thus closing the shutter.

With the shutter mechanism of single shaft rotating type described above, the shutter drive member 101 is maintained at rest in its start position by engaging the arm 101a with detent member 105. The detent member 105 is in the form of a plate-like lever which is mounted to oscillate in the vertical plane and has a broad side against which one side of the arm 101a engages in face-to-face contact manner. Upon shutter release, this causes a twisting action to occur between the arm 101a and detent member 105, resulting in an unstable release operation. Specifically, since arm 101a is strongly urged to rotate counter-clockwise by the spring 103, it abuts against detent member 105 with a force of sufficient strength to present a large resistance to a sliding movement between the members 101 and 105, resulting in the twisting action when the release operation takes place.

To achieve a high speed shutter operation, it is desirable that drive member 101 be capable of rotating through one revolution at its maximum speed without experiencing any constraint or engagement. However, with the conventional mechanism illustrated in FIG. 1, it is once engaged by the detent member 106 adjacent to the fully open shutter position, presenting a difficulty to the achievement of a high speed shutter operation and causing a bouncing of shutter blades.

It will be noted that a camera incorporating an electrical shutter usually includes a variety of electrical accessory circuits including a fixed exposure period selection circuit which permits a synchro-flash photography, an exposure factor modification circuit which may be utilized during the photographing operation under the rear light illumination, a battery check circuit, an electrical self-timer circuit or the like, all of which are connected in circuit with the electrical shutter circuit. These accessories circuits are connected with the shutter circuit by using a changeover switch. By way of example, FIG. 2(A) shows a fixed exposure period selection circuit which may be connected with the shutter circuit. Specifically, the shutter circuit includes capacitor 201 which forms part of a photometric circuit and which is connected with the movable contact of changeover switch 202 having fixed contacts which are in turn connected with photometric, light receiving element 203 and with resistor 204 which is used to provide a fixed exposure period. During a flash photography operation, the switch 202 is thrown to the fixed contact associated with resistor 204 to form a time constant circuit with capacitor 201 and resistor 204, thus establishing a fixed exposure period for operating a comparator 205. FIG. 2(B) shows an automatic exposure control circuit 206 and a battery check circuit 207 which are selectively connected across a battery through changeover switch 208.

It will be appreciated that such additional means which are connected through changeover switches cannot operate properly if the switch fails. In addition, the failure of such switch may prevent a proper functioning of the inherent shutter circuit.

SUMMARY OF THE INVENTION

It is a first object of the invention to provide an electrical shutter of electromagnetic release type for a camera which avoids the above described disadvantages, by the provision of facilitating a movement of a detent member, which maintains a shutter drive member in its start position, away from the shutter drive member and of retracting another detent member associated with the determination of an exposure period so as to avoid its collision with the shutter drive member during a high speed shutter operation.

It is a second object of the invention to provide an electrical shutter for a camera including an electrical shutter circuit having a common supply bus, to which the electrical circuits of various accessories can be electrically connected through normally open switches while assuring the proper operation of the shutter circuit itself even if any one of the switches fails.

In accordance with the invention, the detent member which maintains the shutter drive member in its start position has a bevelled surface for engagement with the latter to provide a linear contact therebetween, thus substantially reducing the frictional resistance as compared with the face-to-face contact in the conventional arrangement and thereby assuring a smooth disengagement. The other detent member which is associated with the determination of an exposure period comprises a double lever, one of which is retracted and the other of which has a bevelled surface that is expelled by the drive member both during a high speed shutter operation, thus assuring the achievement of a reduced exposure period. During normal shutter operations, the drive member bears against said other detent member in a resilient manner so as to avoid a bouncing of the shutter blades.

In another aspect of the invention, various accessories are connected with the shutter circuit through normally open switches and are operative when the switches are selectively turned on. If the accessory or its associated switch fails, the failure does not prevent a proper functioning of the shutter circuit, so that an automatic exposure control is always assured.

DESCRIPTION OF PREFERRED EMBODIMENTS

Figure 1:
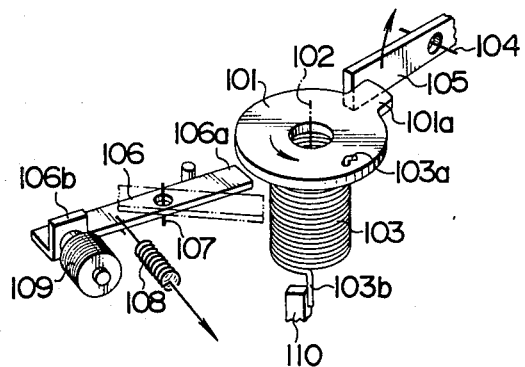
FIG. 1 is a perspective view of shutter drive mechanism as used in a conventional electrical shutter of electromagnetic release type for camera.
Figure 2A:
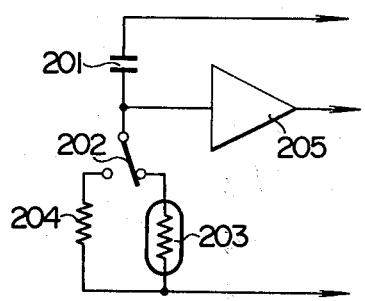
FIGS. 2(A) and (B) are circuit diagrams illustrating switching means which connect the electrical circuits of accessories with a shutter circuit.
Figure 2B:
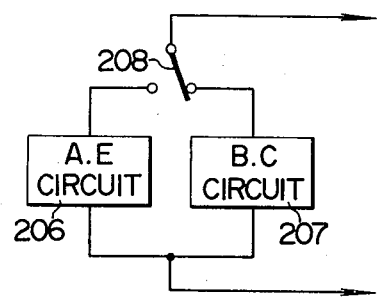
Figure 3:
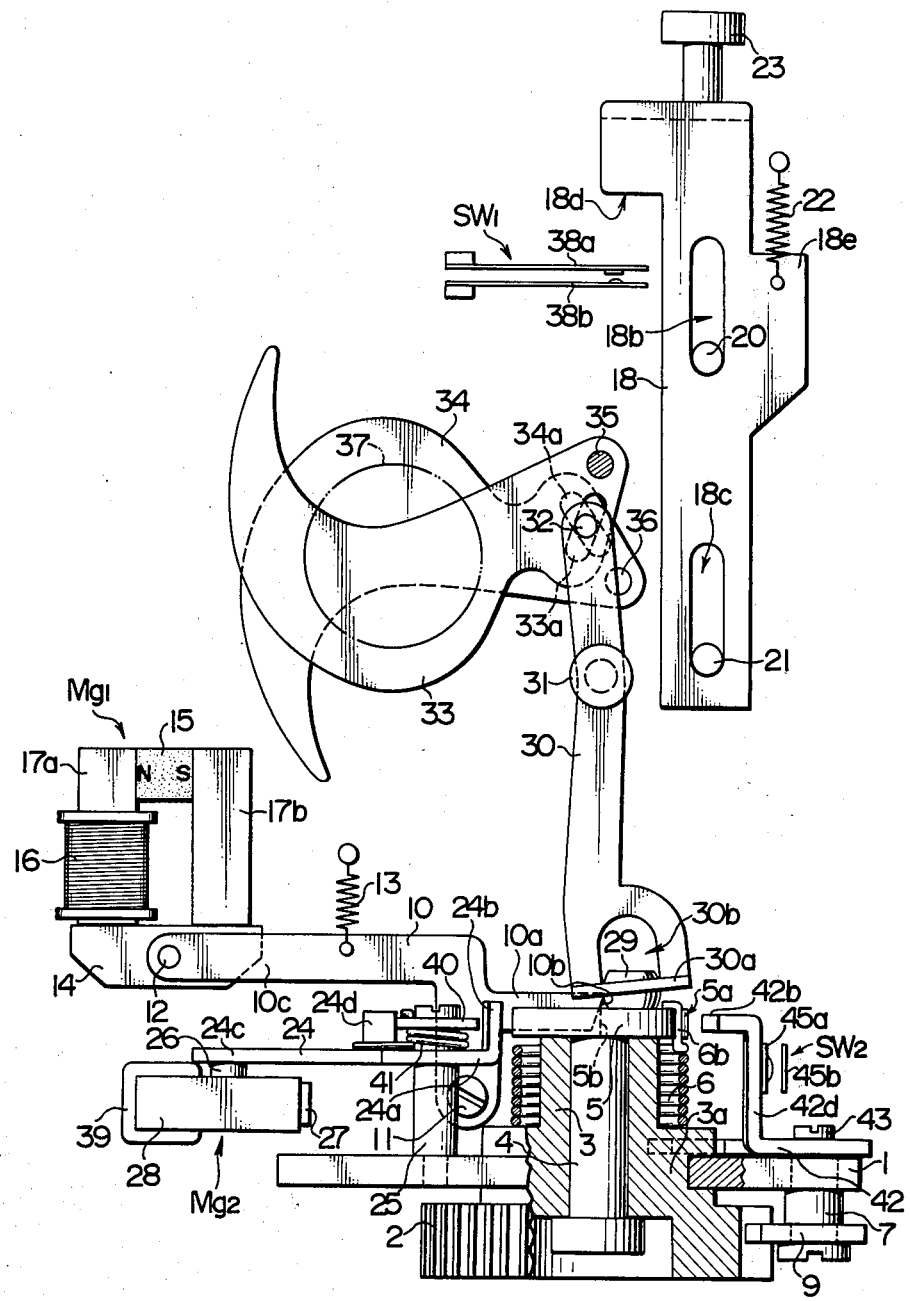
FIG. 3 is a front view of the shutter drive mechanism of the electrical shutter according to one embodiment of the invention.

Referring to FIG. 3, there is shown a baseplate 1, and a gear 2 is integrally formed on the lower end of a charging member 3 which is in the form of a hollow shaft and having a journal 3a which is rotatably received in the baseplate 1. A shaft 4 is rotatably received in the charging member 3 and has a disc-shaped shutter drive member 5 secured to the top end thereof. A prime mover spring 6 is disposed on the member 3, and has its lower end 6a (see FIG. 4) engaged with one end of a stop arm 3b which is formed on the upper end face of the journal 3a and extending in a direction perpendicular to the plane of FIG. 4. Spring 6 has its upper end 6b (see FIG. 4) engaged in a notch 5a formed in the periphery of shutter drive member 5. In this manner, the spring 6 provides an operative connection between charging member 3 and shutter drive member 5.

Figure 4:
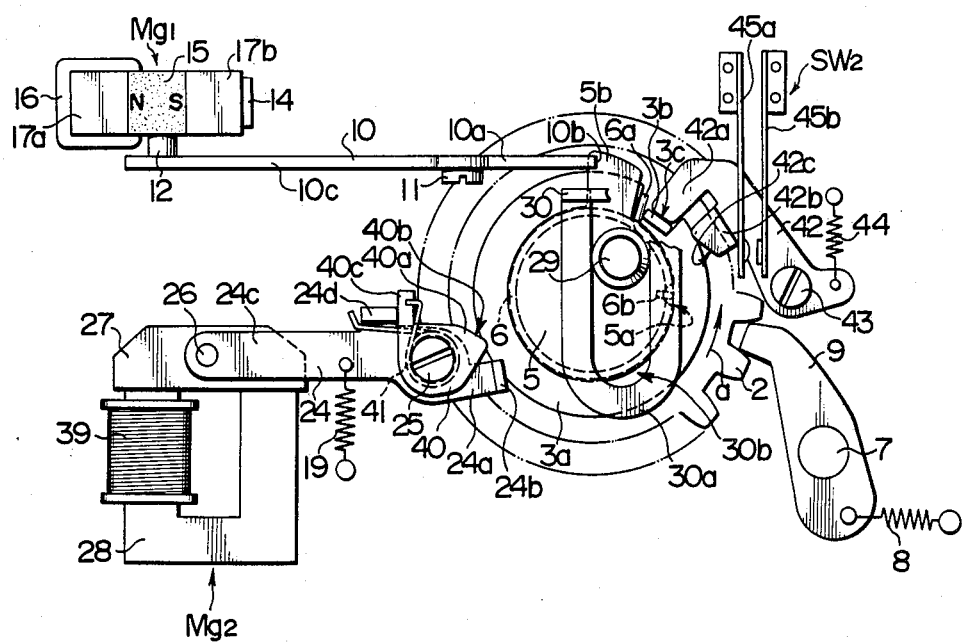
FIG. 4 is a plan view of the shutter drive mechanism.

Gear 2 is operatively connected with a film winding mechanism, not shown, which may have a known arrangement, and is adapted to rotate in a direction indicated by an arrow a shown in FIG. 4 in response to a film winding operation. Gear 2 is engaged by ratchet pawl 9 which is mounted on stud 7 and urged by coiled spring 8 into engagement with the gear 2, thus preventing rotation of gear 2 in the opposite direction from that shown by the arrow a.

Figure 5:
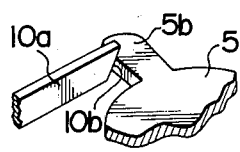
FIG. 5 is a fragmentary perpsective view, illustrating the abutting engagement between certain parts of the shutter drive mechanism.

As shown in FIG. 4, shutter drive member 5 is peripherally formed with an arm 5b, against which a detent arm 10a abuts, the arm 10a being formed as one arm of detent member 10 which defines the start position of the shutter drive member. As shown in FIGS. 3 and 4, detent member 10 is in the form of a lever which is pivotally mounted on pin 11. In FIGS. 3 and 5, the detent arm 10a has an edge 10b which represents a bevelled surface extending in an oblique direction downwardly and to the left, thus providing a linear contact against one lateral edge of the arm 5b. The detent member 10 has another arm 10c which extends in the opposite direction from detent arm 10a and which has an armature piece 14 secured to its free end by means of pin 12, the armature piece 14 being adapted to be held attracted to shutter release magnet Mg1. The arm 10c is engaged by coiled tension spring 13, thus normally urging detent member 10 to rotate clockwise about pin 11. As a consequence, the edge 10b of the detent arm 10a is brought into abutment against arm 5b while armature piece 14 is in abutment against the mating surface of magnet Mg1.

In the present embodiment, the magnet Mg1 comprises a combination of permanent magnet 15 and solenoid coil 16, and thus forms a release electromagnet. Specifically, permanent magnet 15 is held between a pair of yokes 17a, 17b, and coil 16 is disposed on yoke 17a. Usually, the magnetic force from permanent magnet 15 holds the armature piece 14 attracted to the ends of the yokes, thus constraining it. However, when coil 16 is energized to magnetize the electromagnet comprising the yokes and coil, in a direction to counteract the magnetic force from permanent magnet 15, the armature piece 14 is released from constraint. The exciting current may be a current pulse.

Located in the path of rotation of arm 5b of the drive member 5 is controller 24b formed on one arm 24a of another detent member 24 and which is engaged by arm 5b when shutter blades 33, 34, to be described later, assume their fully open positions. The detent member 24 is in the form of a lever which is pivotally mounted on a pin 25 secured to the baseplate 1. Controller 24b is in the form of an upstanding piece formed at the free end of arm 24a. The detent member 24 has another arm 24c which extends in the opposite direction from the arm 24a and which has an armature piece 27 secured to its free end by means of pin 26, the armature piece 27 being held attracted to magnet Mg2 which controls the shutter closing operation. Magnet Mg2 comprises a channel-shaped yoke 28 and exciting coil 39. When the coil 39 is energized, it holds the armature piece 27 attracted thereto to thereby constrain it, but frees it when deenergized.

The arm 24c is engaged by coiled tension spring 19, which normally urges the detent member 24 to rotate counterclockwise about pin 25. As a consequence, the controller 24b is located in the path of movement of the arm 5b and the armature piece 27 is held in abutment against the mating surface of magnet Mg2. Pin 25 is fixedly mounted on the upper surface of detent member 24 and pivotally mounts an engagement control member 40, which is formed with a bulging edge 40a which is located adjacent to the controller 24b on the side thereof which is advanced, as viewed in the counterclockwise rotation of the arm 5b, and which extends into the path of rotation of the arm 5b. On its side remote from the controller 24b, the edge 40a has a bevelled surface 40b, the arrangement being such that the arm 5b rotates counterclockwise, it initially bears against the bevelled surface 40b to expel it to cause a clockwise rotation of control member 40 about pin 25, and then engages the controller 24b. Control member 40 and detent member 24 are operatively connected together by means of spring 31 so as to form a double lever. Specifically, spring 41 comprises a torsion spring disposed on pin 25 and has its one end engaged with upstanding piece 24d, formed along one lateral edge of the arm 24c, and has its other end engaged with extension 40c projecting in a direction at right angles to the edge 40a. Consequently, control member 40 is urged to rotate counterclockwise about pin 25, but the resulting rotation is blocked normally by the abutment of extension 40c against upstanding piece 24d to maintain the bulging edge 40a in the path of rotation of arm 5b.

Figure 6:
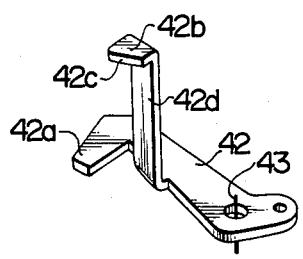
FIG. 6 is a perspective view of the hook contained in the shutter drive mechanism.

As shown in FIG. 4, the journal 3a is formed in notch 3c which is engaged by a film locking hook 42, at a position outwardly of stop arm 3b which is engaged by the lower end 6a of spring 6. Hook 42 is pivotally mounted on stationary stud 43 and is urged to rotate counter-clockwise about stud 43, by coiled tension spring 44 which engages the rear end thereof. As shown in FIG. 6, hook 42 has an inverted L-configuration extending from the pivoted end, having a hook end 42a which is adapted to engage notch 3c. An upright piece 42d extends vertically upward from its lateral edge located nearer journal 3a intermediate its length, and is formed with release arm 42b which is bent from the arm 42b to extend toward the path of rotation of arm 5b. Release arm 42b is formed with bevelled edge 42c which extends nearer the journal 3a as viewed in the direction of rotation of arm 5b. Thus arm 5b is capable of engaging bevelled edge 42c to rotate hook 42 clockwise about pivot 43, thus moving hook end 42a out of notch 3c. However, the resilience of spring 44 normally urges hook 42 to rotate counter-clockwise about pin 43, as shown in FIG. 4, whereby hook end 42a engages notch 3c to prevent a rotation of charging member 3 to provide a film locking function. Under this condition, the bevelled edge 42c is located in the path of rotation of arm 5b.

As shown in FIGS. 3 and 4, a normally open switch SW2 comprising resilient blades 45a, 45b is disposed adjacent to but outwardly of upright piece 42d. The purpose of switch SW2 is to disconnect the shutter circuit from a power source upon termination of a film winding operation. The switch is closed by upright piece 42d when hook 42 rotates clockwise about pin 43, and is opened upon termination of a film winding operation when hook 42 rotates counter-clockwise about pin 43 and hook end 42a engages notch 3c.

FIG. 3 shows shutter release member 18 which is a vertically aligned elongated rod having a pair of vertically spaced elongated slots 18b, 18c formed therein, which respectively receive stationary pins 20, 21, thus enabling a sliding movement thereof in the vertical direction. Release member 18 is normally pulled upwardly by coiled spring 22, and the extent of such movement is defined by the engagement between stationary pin 21 and slot 18c. Shutter release button 23 is fixedly attached to the top end of release member 18.

Drive pin 29 is fixedly mounted on the upper end face of shutter drive member 5 adjacent to the periphery in the upper, right-hand region thereof, as viewed in FIG. 4. Pin 29 fits into elongated opening 30b defined by horizontally extending U-shaped portions 30a formed at the lower end of connecting rod 30, as shown in FIG. 3. It is to be understood that only the lower portion of connecting rod 30 is shown in FIG. 4.

As indicated in FIG. 3, connecting rod 30 is pivotally mounted on stud 31, and fixedly carries pin 32 on its upper end which fits into elongated slots 33a, 34a simultaneously, which are formed in one end of shutter blades 33, 34. These shutter blades 33, 34 are pivotally mounted on separate studs 35, 36, and close a photographing optical path 37 under the condition shown in FIG. 3. Shutter blades 33, 34 constitute together a so-called vario type shutter, and open or close the optical path 37 in accordance with the oscillating motion of connecting rod 30 about stud 31 as the shutter drive member 5 rotates under the resilience of spring 6 to move drive pin 29.

As shown in FIG. 3, shutter release member 18 is formed with step 18d adjacent to its top end and on the left-hand side thereof, and a normally open release switch SW1 comprising resilient blades 38a, 38b is disposed below step 18d. The switch SW1 remains open under the condition shown in FIG. 3.

Figure 10:
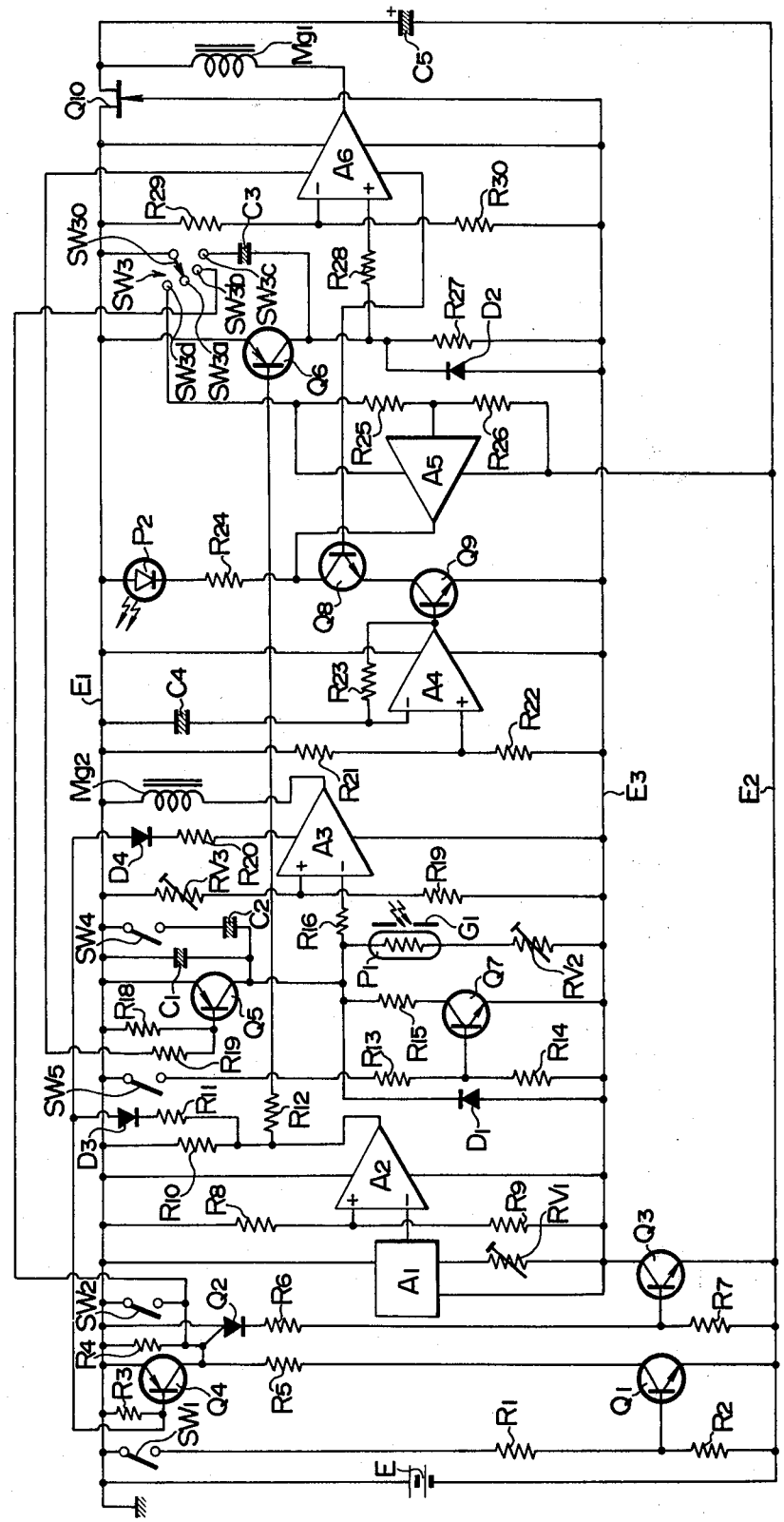
FIG. 10 is a circuit diagram of one exemplary electrical circuit of the electrical shutter of the invention.

FIG. 10 shows an electrical shutter circuit which automatically controls the described shutter mechanism. Referring to FIG. 10, a pair of positive and negative busses E1, E2 are connected across the positive and negative terminals of power source E. Connected across these busses are a series circuit including release switch SW1 and resistors R1, R2; another series circuit including transistor Q4, resistor R5 and starting transistor Q1; and a further series circuit including power supply connection transistor Q2 formed by a programmable unijunction transistor PUT, resistor R6 and resistor R7. Transistor Q2 has its anode connected with bus E1 and its cathode connected with resistor R6 while its gate is connected with the collector of transistor Q4. Connected across the gate and bus E1 is a parallel combination of resistor R4 and switch SW2. Resistor R3 is connected across the base of transistor Q4 and bus E1.

Capacitor C5 is connected across busses E1, E2 through a discharge preventing transistor Q10 which is formed by field effect transistor FET. Capacitor C5 is normally charged from the source E, and discharges in a pulse manner through magnet Mg1 when shutter button 23 (see FIG. 3) is depressed to close switch SW1, provided the source voltage is at or above a given value, thus demagnetizing magnet Mg1 to start the operation of the shutter mechanism.

A common bus E3 is connected with bus E2 through switching transistor Q3. Connected across busses E3 and E1 are the essential shutter control circuit as well as the electrical circuits of accessories such as self-timer circuit, battery check circuit or the like. Transistor Q3 has its collector connected with bus E3, its emitter connected with bus E2 and its base connected with the junction between resistors R6, R7, thus connecting the bus E3 with bus E2 when transistor Q2 is rendered conductive. As a consequence, transistor Q3 essentially constitutes a power switch.

A source voltage decision circuit is connected across busses E3 and E1, and includes a regulator circuit A1 which forms a constant voltage source, a voltage divider including resistors R8, R9, a comparator A2 which essentially forms the decision circuit, and resistor RV1 which establishes a given source voltage level. Resistor R10 is connected across the output of comparator A2 and bus E1, and a source disconnection circuit including a series circuit of resistor R11 and diode D3 is connected across the output terminal of comparator A2 and the base of transistor Q4. The decision circuit is followed by a series circuit including normally open switch SW5 which is closed during flash photography, and resistors R13, R14 as well as a series circuit including resistor R15 and transistor Q7 and which provides a long exposure period. Then follows a series circuit including time constant capacitor C1, light receiving element P1 which may comprise a photoelectric transducer element such as CdS or the like, the semi-fixed resistor RV2; a voltage divider including semi-fixed resistor RV3 and resistor R19; and photometric circuit which includes comparator A3. The junction between capacitor C1 and element P1 is connected through resistor R16 to one input of comparator A3 while the junction between resistor RV3 and R19 of the voltage divider is connected with the other input of comparator A3. Diode D1 is connected across the junction between capacitor C1 and element P1 and the bus E3. Connected across the same junction and the bus E1 is transistor Q5, which forms a trigger switch, in parallel relationship with capacitor C1. Resistor R18 is connected across the base of transistor Q5 and bus E1, and the base is connected with resistor R19 through which an operating signal from comparator A6, to be described later, is applied. An exposure correction circuit formed by a series combination of switch SW4 and capacitor C2 is connected across capacitor C1, and switch SW4 is closed whenever it is desired to change the exposure factor. Magnet Mg2 is connected across the output of comparator A3 and bus E1. A disconnection circuit formed by a series combination of resistor R20 and diode D4 is connected between the comparator A3 and the base of transistor Q4. The disconnection circuit seres as the means for turning transistor Q2 off through transistor Q4 in response to a signal from comparator A3 whenever magnet Mg2 is deenergized. The light input to element P1 is supplied through a diaphragm G1.

The photometric circuit is followed in turn by a voltage divider including series resistors R21, R22; another series circuit including comparator A4, light emitting element P2 formed by light emitting diode, resistor R24 and transistors Q8, Q9; a time constant circuit including capacitor C3 and resistor R27; and a self-timer circuit formed by diode D2. The junction between resistors R21 and R22 is connected with one input of comparator A4 while capacitor C4 is connected between the other input of comparator A4 and bus E1. Resistor R23 is connected between the other input of comparator A4 and the output thereof, and the output terminal is also connected with the base of transistor Q9. Transistor Q8 has its base connected with the final stage comparator A6, which will be described later, so as to be turned off in response to a signal from comparator A6 when magnet Mg1 is energized. The purpose of the time constant circuit formed by capacitor C3 and resistor R27 is to establish a delay time for the self-timer, and the time constant circuit is connected between the fixed contact SW3c of changeover switch SW3 and bus E3. The junction between capacitor C3 and resistor R27 is connected through resistor R28 to one input of comparator A6.

The self-timer circuit is followed by a battery check circuit, which comprises comparator A5 which determines the source voltage, and a voltage divider formed by resistors R25, R26. These series resistors are connected between the fixed contact SW3d of switch SW3 and bus E2, and the junction between these resistors is connected with an input of comparator A5. An operating voltage for comparator A5 is supplied through the contact SW3d and bus E2, and its output terminal is connected with the junction between the collector of transistor Q8 and resistor R24.

The final stage is formed by a magnet drive circuit which activates shutter release magnet Mg1. It comprises a voltage divider formed by resistors R29, R30, comparator A6, magnet Mg1, and transistor Q6. The junction between resistors R29, R30 is connected with the other input of comparator A6 while magnet Mg1 is connected with the output terminal of comparator A6 as shown. Transistor Q6 has its emitter connected with bus E1 and its collector connected with the junction between capacitor C3 and resistor R27 while its base is connected through resistor R12 to the output terminal of comparator A2. It should be noted that the bus E1 which is connected with the positive terminal of the source E is connected with the ground.

Figure 11:
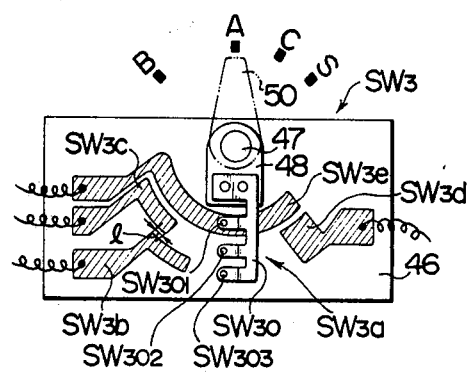
FIG. 11 is a detailed plan view of switch SW3 shown in schematic fashion in FIG. 10.

The changeover switch SW3 comprises a rotary switch having a selection knob which is turned to enable the operation of the self-timer and a checking of the battery voltage. Specifically, it includes four fixed contacts, including battery check contact SW3d, automatic exposure contact SW3a, clear contact SW3b and self-timer contact SW3c, over which its movable contact SW30 can be moved in rotary fashion. It will be noted that automatic exposure contact SW3a has no connection whatsoever while clear contact SW3b is connected with the gate of transistor Q2. The mechanical construction of the switch SW3 is shown in FIG. 11. Referring to this Figure, it includes an electrically insulating substrate 46 on which fixed contacts SW3c, SW3b, SW3d are formed as by conductive foils which are printed thereon. An insulating member 48 is used to fixedly mount the movable contact SW30 on a rotary shaft 47 which is rotatably mounted in the substrate 46. As shown, the movable contact SW30 is formed with three sliding contact pieces SW301, SW302, SW303, and fixed contacts SW3c, SW3b, SW3d are disposed on the paths of rotation of these sliding contact pieces.

It will be seen that sliding contact SW301 is located closest to the shaft 47 and is normally maintained in contact with an arcuate shaped, common fixed contact SW3e, which is connected with bus E1 to supply an operating voltage to the other fixed contacts through the movable contact SW30 when switch SW3 is selectively turned.

Fixed contact SW3c is located externally of the common contact SW3e and toward the left-hand side, as viewed in FIG. 11, for engagement with sliding contact piece SW302. Fixed contact SW3d is located on the opposite side from contact SW3c or on the right-hand side, as viewed in FIG. 11, for engagement with bath sliding contact pieces SW302 and SW303. Fixed contact SW3b is located externally of fixed contact SW3c, but closer to fixed contact SW3d, for engagement with sliding contact piece SW303. The automatic exposure contact may be considered as located intermediate the fixed contacts SW3b and SW3d.

It will be noted that the right-hand end of the self-timer contact SW3c has an overlap circumferentially with the left-hand end of the clear contact SW3b over a length l. When the movable contact SW30 is located in such overlap region, sliding contact piece SW302 engages fixed contact SW3c at the same time as sliding contact piece SW303 engages fixed contact SW3b. The basic idea of this arrangement is that the shutter circuit of the invention is constructed such that an automatic exposure mode is established except during the battery check mode and the self-timer mode. The purpose of such arrangement will be appreciated if one considers a situation in which the shutter button is depressed after establishing the self-timer, but it is desired to stop the photographing operation by returning the changeover switch SW3. An automatic exposure mode will then be automatically established, thus causing an immediate release operation. To prevent this, when switch SW3 is returned after the self-timer mode has been once established, contact SW30 moves over clear contact SW3b when it moves through the overlap region l where it engages both the self-timer contact SW3c and the clear contact SW3b, thus disconnecting the circuit from the source to reset the shutter circuit to its initial condition. Consequently, a shutter release cannot occur unless the shutter button is depressed once again. The shaft 47 extends above the top surface of camera where selection knob 50 is secured thereto so as to be turned into alignment with indices A, B and S which represents the automatic photographing, battery check and self-timer mode, respectively.

The operation of electrical shutter will now be described. FIGS. 3 and 4 show the shutter mechanism in its charged condition after the completion of a film winding operation. Spring 6 is charged to urge shutter drive member 5 to rotate counter-clockwise, but such movement is constrained by the abutment of arm 5b against the detent portion 10b of the detent member 10 which is constrained by shutter release magnet Mg1. Thus, drive member 5 is maintained in its start position. The bevelled surface of the detent edge 10b is urged in the upward direction by arm 5b under this condition.

When it is desired to take a picture in the automatic exposure mode, the selection knob 50 may be moved into alignment with the index A and shutter button 23 depressed. As shown in FIG. 11, when knob 50 is aligned with index A, the movable contact SW30 engages none of the fixed contacts. Also, both shutter blades 33, 34 are closed as shown in FIG. 3. The depression of release button 23 causes release member 18 to move downward, with its step 18d closing release switch SW1. Then transistor Q1 is turned on in the electrical circuit shown in FIG. 10, and the conduction of this transistor bypasses the anode-gate path of transistor Q2 to turn it on, thus turning the next following transistor Q3 on. At this time, transistor Q4 remains off. Since transistor Q2 comprises a programmable unijunction transistor as mentioned previously, it continues to conduct even if release switch SW1 is opened after its conduction has been initiated, thus maintaining transistor Q3 on to maintain the circuit connected with the source E.

When transistor Q3 is turned on, the source voltage is applied across busses E1, E3. Initially, the source voltage is checked by regulator circuit A1, comparator A2 or the like. If the detected value is lower than a preselected reference value, the final stage transistor contained in comparator A2 conducts to supply a base current to transistor Q4 through diode D3 and resistor R11, thus turning it on to short-circuit the anode-gate path of transistor Q2 to render it non-conductive. Thereupon, the base current ceases to be supplied to transistor Q3, which is therefore turned off. This interrupts the connection of the busses E3, E1 with the source, so that the circuit is reset and cannot operate.

However, when the source voltage is found to be higher than the preselected reference value, the final stage of comparator A2 remains off, and hence transistor Q4 is maintained off. Since transistor Q6 is off at this time, the voltage drop across resistor R27 is zero, whereby a negative input is applied to comparator A6 which is of a higher potential than that applied to its positive input. Thus NPN transistor contained in the final stage of comparator A6 is turned on. Thereupon, the charge on capacitor C5 discharges through winding 16 of shutter release magnet Mg1 in pulse-like manner, thus counteracting the attraction of magnet 15.

Upon demagnetization, the armature piece 14 which has been constrained by magnet Mg1 is freed as shown in FIG. 3, so that arm 5b expels the detent edge 10b under the resilience of spring 6 to cause detent member 10 to rotate counter-clockwise about the shaft 11, thus starting the shutter drive member 5. When the detent is released, the bevelled surface of the detent edge 10b presents a reduced frictional resistance with respect to arm 5b, thus assuring a facilitated disengagement thereof.

Figure 7:
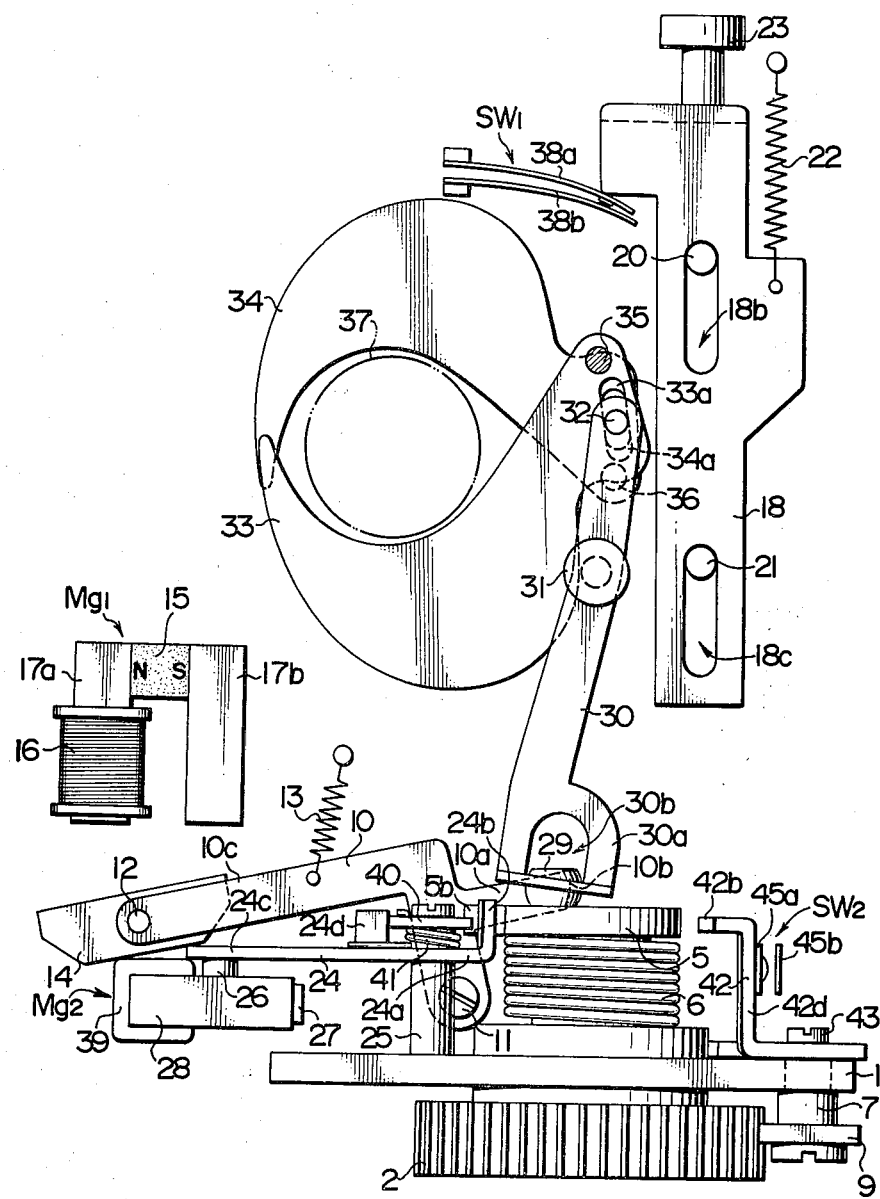
FIG. 7 is a front view of the shutter drive mechanism shown in FIG. 3 in its operative position.
Figure 8:
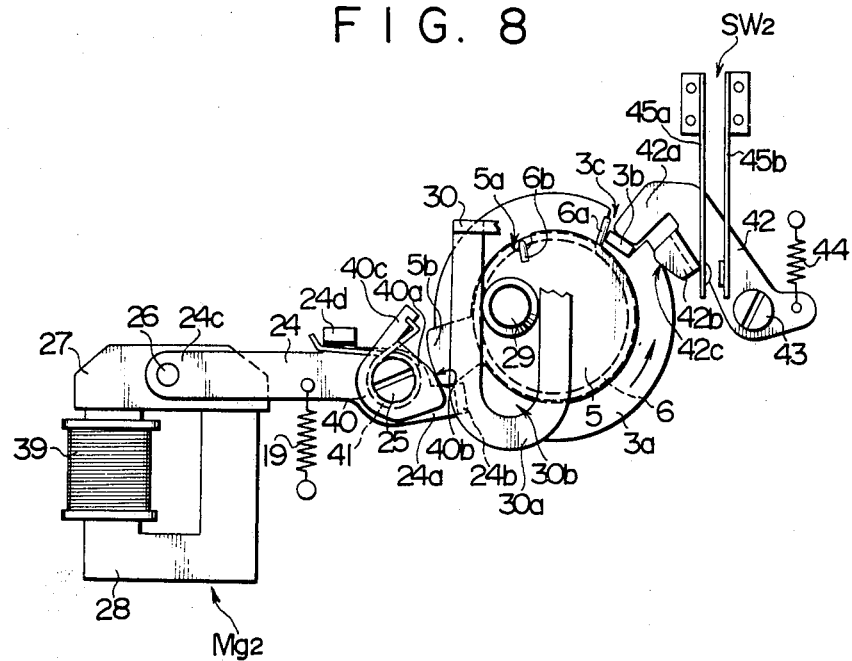
FIGS. 8 and 9 are plan views, illustrating the shutter drive mechanism of FIG. 4 in its operative position.

When drive member 5 rotates in the direction of arrow a shown in FIG. 4 and reaches its position shown in FIG. 8, drive pin 29 which is integral therewith causes connecting rod 30 to be rocked from its position shown in FIG. 3 to its position shown in FIG. 7, whereby shutter blades 33, 34 cooperate with each other to begin opening. The photographing optical path 37 is completely opened as shown in FIG. 7 when arm 5b expels the bulging edge 40a of control member 40 and is locked by control portion 24b (see FIG. 8).

When arm 5b expels the bulging edge 40a, control member 40 rotates clockwise about the stud 25 against the resilience of its associated spring 41, causing both of its limbs to move apart to facilitate a movement of detent member 24 away from magnet Mg2. Since arm 5b abuts against the bevelled edge 40b before it is locked by control portion 24b, it does not abut against the control portion 24b with an increased force, thus achieving a smooth locking action and assuring a full opening of shutter blades 33, 34 without causing a bouncing thereof.

At the same time that comparator A6 supplies an energizing current to magnet Mg1, an off signal is applied from comparator A6 to trigger transistor Q5, shown in FIG. 10, through resistor R19. This turns transistor Q5 off, initiating the operation of the photometric circuit. The circuit performs an integration of the amount of reflective light from an object being photographed by the time constant circuit including capacitor C1, light receiving element P1 and adjustable resistor RV2. The intergrated signal is applied to comparator A3. The time constant circuit has a time constant which is determined by $C1' \times (R_{CdS} + RV2')$ where $R_{CdS}$ represents the resistance of element P1 which corresponds to the amount of light received, $C1'$ the capacitance of capacitor C1 and $RV2'$ the resistance of semi-fixed resistor RV2. It will be seen that a proper exposure period for the object being photographed is defined by the time interval required for capacitor C1 to be charged to a level which is sufficient to provide a negative input to comparator A3 which equals the potential at the junction between resistors RV3, R19, whereupon comparator A3 is operated to deenergize magnet Mg2, thus closing the shutter. As described previously, magnet Mg2 is immediately energized when transistor Q3 is turned on to constrain the armature piece 27, thus constraining detent member 24. However, when it is deenergized, the constraint is removed, so that detent member 24 is free to rotate clockwise about stud 25 since its control portion 24b is urged by arm 5b as shown in FIG. 8. Thus, control portion 24b is retracted out of the path of rotation of arm 5b. When drive member 5 rotates counter-clockwise from the position shown in FIG. 8 to the position shown in FIG. 9, it abuts against the lateral side of stop arm 3b where its rotation is interrupted. Shutter blades 33, 34 begin to close the shutter opening when drive member 5 moves past the position shown in FIG. 8, and the optical path 37 is completely closed when drive member 5 reaches its stop position.

Where an object being photographed is under such a bright illumination as to energize control magnet Mg2 only for a brief period of time, detent member 24 can be angularly moved under the resilience of spring 41 to permit a rotation of arm 5b without accompanying its abutment against control portion 24b since arm 5b initially expels bevelled edge 40b to rotate control member 40 about stud 25 to move both limbs of spring 41 apart, thus allowing its resilience to rotate detent member 24 clockwise about stud 25. Consequently, a high speed shutter operation is enabled without causing a reduction in the speed of rotation of drive member 5.

When magnet Mg2 is deenergized, comparator A3 supplies a base current to transistor Q4 through resistor R20 and diode D4, thus short-circuiting the anode-gate path of transistor Q2 to render it non-conductive and turning transistor Q3 off. This interrupts the connection of the electrical circuit with the source, interrupting the connection path provided by transistor Q2.

Figure 9:
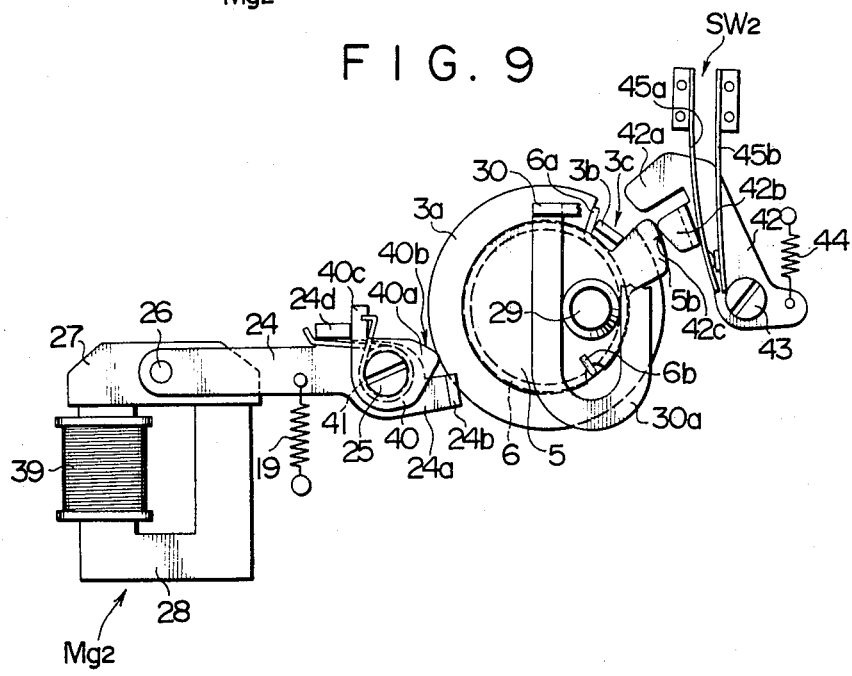

Arm 5b drives the bevelled edge 42c of hook 42 immediately before it abuts against the stop arm 3b, and hence hook 42 rotates clockwise about stud 43 to have its hook end 42a disengaged from notch 3c, as shown in FIG. 9. The angular movement of hook 42 enables its upstanding piece 42d to close switch SW2, which short-circuits the anode-gate path of transistor Q2 to turn it off, again interrupting the connection with the source.

It will be seen that the connection with the source which is achieved by transistor Q2 is interrupted at the end of the shutter operation by two separate means each including switch SW2 and transistor Q4. However, it will be seen that at least one means, for example, the provision of switch SW2, is sufficient. However, the short-circuiting action by transistor Q4 is provided for added assurance. It is intended in the arrangement of the invention that switch SW2 be effective to interrupt the connection with the source when a film winding operation is completely terminated and when the shutter is not yet operated. In other words, the depression of release button 23 does not initiate a shutter operation unless this switch is so operated. The provision of transistor Q4 is obviously necessary for the interruption of the source connection under a reduced source voltage condition.

When a film winding takes place after the termination of the automatic exposure with the electrical shutter of the invention, gear 2 rotates and its integral stop arm 3b angularly drives the lower end 6a of spring 6, which in turn causes shutter drive member 5 to rotate until its arm 5b bears against the bevelled surface 10b of detent member 10. When such position is reached, drive member 5 is maintained stationary at its start position. Only gear 2 continues to rotate to charge spring 6. When the rotation of charging member 3 brings notch 3c formed in its journal 3a into alignment with the hook end 42a, hook 42 rotates counterclockwise about stud 43 against the resilience of associated spring, permitting hook end 42a to be engaged with notch 3c to lock the film, where charging member 3 ceases to rotate. In this manner, at the end of the film winding operation, the various members return to their initial positions shown in FIGS. 3 and 4 in preparation for the next photographing operation.

It is to be noted that hook 42 has an important role in the shutter arrangement of the invention. Hook 42 engages notch 3c to block the rotation of gear 2 immediately before stop arm 3b is engaged by arm 5b during the rotation of gear 2 in response to a film winding operation. This means that arm 5b is normally urged by the charged spring 6 to rotate while expelling the detent edge 10b when it is in abutment against the latter. As a consequence, the shutter may start to run if stop arm 3b applies an undue force upon arm 5b accidentally. This is prevented by the engagement of hook 42 with notch 3c which occurs immediately before arm 5b abuts against stop arm 3b, thus interrupting the rotation of charging member 3 and gear 2 which charge spring 6.

When it is desired to change an exposure factor which is used during the automatic exposure mode, exposure correction switch SW4 shown in FIG. 10 may be closed. When it is closed, capacitor C2 is connected in shunt with capacitor C1 in the time constant circuit of the photometric circuit, and hence the total capacitance increases to $C1+C2$ or the exposure period is modified to $(C1+C2)/C1$ times the original value.

An elongated exposure period can be established as during a flash photography, by closing switch SW5. The closure of this switch renders transistor Q7 conductive, connecting resistor R15 in shunt with the series circuit comprising light receiving element P1 and resistor RV2. Thus, while the photometric circuit operates in response to the illumination level of natural light when the original series circuit is used, the connection of resistor R15 establishes an exposure period determined by the resistance of resistor R15, for example, 1/30 sec.

When the use of the self-timer is desired, selection knob 50 (FIG. 11) may be turned into alignment with the self-timer index S before shutter release. This changes switch SW3 so that movable contact SW30 engages fixed contact SW3c. Referring to FIG. 10, the timer circuit or time constant circuit comprising capacitor C3 and resistor R27 is then connected across busses E1 and E3, so that the operation of comparator A6 is delayed by a time interval, for example, 15 seconds, which is preset in the self-timer, from the turning on of transistor Q3 in response to the depression of release button 23. During the delay time, magnet Mg1 is not energized, so that an on signal is applied from comparator A6 to transistor Q8 to render it conductive. When this transistor is turned on, a blocking oscillator is formed by comparator A4, capacitor C4, resistor R23 and transistor Q9, and produces an output which causes a flashing of a luminescent display comprising light emitting element P2 and resistor R24. During the time element P2 flashes, it indicates that the self-timer is in operation. The period of flashing operation is determined by a time constant of capacitor C4 and resistor P23 as well as the ratio of resistors R21, R22. When the self-timer times out, comparator A6 and magnet Mg1 operate to achieve an automatic exposure operation as mentioned previously.

When it is desired to interrupt the photographing operation which employs the self-timer before the completion thereof, by turning selection knob 50 to the automatic exposure position, movable contact SW30 then engages fixed contacts SW3c and clear contacts SW3b simultaneously as switch SW3 is brought to the automatic exposure position, whereby the connection of the electrical circuit with the source E is interrupted, returning the circuit to its initial condition. Though movable contact SW30 engages clear contact SW3b during its movement, it cannot be locked in position, so that knob 50 cannot be stuck in alignment with the clear index C.

When it is desired to examine the source voltage, selection knob 50 may be turned into alignment with the battery check index B. Then, switch SW3 is changed, bringing movable contact SW30 into contact with fixed contact SW3d. At this time, the battery check circuit including comparator A5, resistors R25, R26, light emitting element P2 and resistor R24 is connected across the source E, independently of the remainder of the circuit. If the source voltage is equal to or above a given reference value, element P2 illuminates. The element P2 does not illuminate when the source voltage is below the reference value. In this manner, an indication is provided whether or not the battery is usable.

Figure 12:
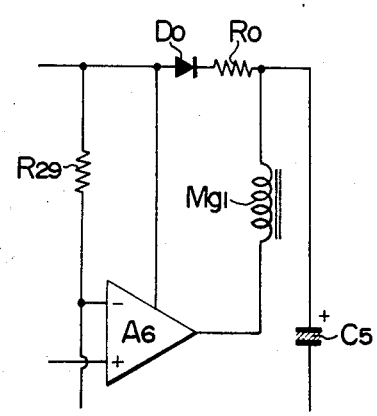
FIG. 12 is a circuit diagram of another example of a circuit which prevents the discharge of capacitor C5.

In the described arrangement, FET transistor Q10 is used and is turned off when the transistor Q3 is turned on in order to avoid a discharge of capacitor C5 when transistor Q3 is turned on. However, transistor Q10 can be replaced by a series combination of diode D0 and resistor R0 as shown in FIG. 12. This prevents the terminal voltage of capacitor C5 from being added to the source voltage during the battery check and assures a reliable battery check operation.

What is claimed is:

1. An electrical shutter for a camera comprising a shaft, a prime mover spring for driving said shutter, a charging member which rotates about said shaft in response to a film winding operation to charge said prime mover spring, said shutter having shutter blades movable between an open and a closed position, a shutter drive means for opening or closing the shutter blades by rotating substantially through one revolution under the resilience of said prime mover spring in response to an electromagnetic release operation, a first detent member for maintaining the shutter drive member stationary at a start position before the shutter is operated, a second detent member which is selectively movable between positions engageable with and disengageable from the shutter drive member as the shutter drive member rotates to open the shutter blades for temporarily maintaining the shutter blades in an open condition to thereby determine the length of an exposure period, said second detent member having a control portion; detent drive means for selective abutting and urging the first detent member and the second detent member to move away from the shutter drive member as the shutter drive member rotates, and an electrical shutter circuit including a first shutter release magnet which controls the operation of the second detent member to thereby control the shutter closing operation, the electrical shutter circuit including means for automatically controlling the time interval during which the shutter blades are maintained in their open position after they have been opened by the rotation of the shutter drive member, said detent drive means comprising a driving arm which is adapted to abut against the control portion formed on the second detent member during rotation of the shutter drive member, and an engagement control member which is disposed adjacent to the control portion of said second detent member and is angularly movable relative to said second detent member, said engagement control member being disposed such that said driving arm initially engages said engagement control member of said second detent member and thereafter engages said control portion, said engagement control member being formed with a beveled surface engageable with said driving arm.

2. An electrical shutter according to claim 1 in which the shutter drive member comprises a disc which is adapted to rotate under the resilience of said charging member, said driving arm projecting from the periphery of said disc and having a drive pin fixedly mounted thereon adjacent to the periphery for opening or closing the shutter blades as the disc rotates.

3. An electrical shutter according to claim 1 in which the first detent member comprises a lever having an arm the end of which is adapted to abut against said driving arm which forms part of the shutter drive member, to maintain the shutter drive member stationary at its start position, the lever also having another arm, the end of said other arm being provided with an armature piece which is adapted to be held attracted to the shutter release magnet.

4. An electrical shutter according to claim 1 in which said first detent member comprises an arm having a bevelled surface which provides a linear contact with the abutting arm of the shutter drive member.

5. An electrical shutter according to claim 1 in which the shutter release magnet is formed as a release electromagnet which includes a permanent magnet and the shutter controlling second magnet is formed as an electromagnet.

6. An electrical shutter in accordance with claim 1 including means for resiliently mounting said engagement control member upon said second detent member to attenuate bouncing of the shutter blades which might otherwise be caused due to the impacting of the shutter drive member arm against said second detent member whereby said engagement control member is impacted by said shutter drive member arm prior to engagement of said second detent member with said arm.

7. An electrical shutter for a camera comprising a shaft, a prime mover spring for driving said shutter, a charging member which rotates about said shaft in response to a film winding operation to charge said prime mover spring, said shutter having shutter blades movable between an open and a closed position, a shutter drive member for opening or closing the shutter blades by rotating substantially through one revolution under the resilience of said prime mover spring in response to an electromagnetic release operation, a first detent member for maintaining the shutter drive member stationary at a start position before the shutter is operated, a second detent member which is selectively movable between positions engageable with and disengageable from the shutter drive member as the latter rotates to open the shutter blades for temporarily maintaining the shutter blades in an open condition to thereby determine the length of the exposure period, detent drive means for urging said first and second detent members to move away from the shutter drive member as the shutter drive member rotates, and an electrical shutter circuit including a first shutter release magnet which operates the first detent member to control the shutter closing operation, the electrical shutter circuit including means for automatically controlling the time interval during which the shutter blades are maintained in their open position after they have been opened by the rotation of the shutter drive member, said charging member being provided with a notch, hook means, and means for urging said hook means into said notch; said shutter drive member being adapted to urge said hook means out of said notch as the shutter drive member reaches the position where it is closing the shutter as an exposure period is terminated, whereupon rotation of the charging member in response to the next film winding operation causes said hook means to re-enter said notch.

8. An electrical shutter in accordance with claim 7 further comprising circuit means for controlling the electric shutter; a power source for said circuit means, switch means operated by movement of said hook means out of said notch for disconnecting said power source from an electrical circuit upon the completion of each shutter operation.

9. An electrical shutter in accordance with claim 7 further comprising an electrical circuit means for controlling the electric shutter, said electrical circuit means including an automatic timing circuit for timing the length of the shutter open period in accordance with prevailing light conditions, and a timing circuit for delaying the performance of a shutter operation; and switch means having first and second switch positions for selectively energizing said automatic and said time delay circuits, said switch means including electrical means for disconnecting both of said circuits from said power source whenever said switch means is moved between said first and second positions.

10. An electrical shutter for a camera including shutter blades movable between opened and closed positions, said electrical shutter comprising;
a rotatable shutter drive member for moving said shutter blades between said opened and closed positions by rotating said shutter drive member from a start position substantially through one revolution;
a prime mover spring for rotatably driving said rotatable shutter drive member;
charging means for charging said prime mover spring in response to a film winding operation;
a first detent member for maintaining said shutter drive member at said start position, thereby permitting said prime mover spring to be charged by said charging means prior to operation of said shutter;
a second detent member selectively movable between positions engageable with and disengageable with said rotatable shutter drive member, said second detent member being located at a position in the rotation path of said rotatable shutter drive member substantially corresponding to said opened position of said shutter blades in said opened position for a predetermined period of time substantially corresponding to the length of an exposure period; and
engagement control means resiliently engageable with said rotatable shutter drive member prior to engagement of said second detent member by said rotatable shutter drive member, whereby said engagement control means attenuates vibrations of said shutter blades which would otherwise be caused by direct impact of said shutter drive member with said second detent member in the absence of engagement control means.

11. An electrical shutter as claimed in claim 10, wherein said rotatable shutter drive member, said second detent member, and said engagement control member respectively rotate in parallel planes.

12. An electrical shutter as claimed in claim 10, wherein said rotatable shutter drive member rotates in a first plane and said first detent member is rotatable in a second plane perpendicular to said first plane.

13. An electrical shutter as claimed in claim 10, wherein said engagement control means is rotatably mounted on said second detent member.

14. An electrical shutter for a camera including shutter blades movable between opened and closed positions, said electrical shutter comprising;
a rotatable shutter drive member for moving said shutter blades between said opened and closed positions, by rotating said shutter drive member from a start position substantially through one revolution, said rotatable shutter drive member including a shutter drive member arm extending therefrom;
a prime mover spring for rotatably driving said rotatable shutter drive member;
a rotatable charging member for charging said prime mover spring by rotating said charging member in response to a film winding operation, said charging member including a notch on the periphery thereof;
hook means selectively movable between positions engageable and disengageable with said notch, so that said hook means prevents rotation of said charging member when engaged with said notch, said hook means further including a release arm extending into the path of rotation of said shutter drive member arm when said hook means is engaged with said notch, so that said shutter drive member arm disengages said hook means from said notch when said shutter drive member arm contacts said release arm and urges said release arm out of its path of rotation; and
a detent member for maintaining said shutter drive member at said start position, thereby permitting said prime mover spring to be charged by said rotatable charging member for operation of said shutter.

15. An electrical shutter as claimed in claim 14, wherein said release arm lies in a different plane from the rest of said hook means.

16. An electrical shutter as claimed in claim 15, wherein said release arm comprises a beveled edge.

17. An electrical shutter as claimed in claim 14, wherein said hook means and said rotatable shutter drive member rotate in the same plane.

* * * * *

UNITED STATES PATENT AND TRADEMARK OFFICE
CERTIFICATE OF CORRECTION

PATENT NO. : 4,231,644
DATED : November 4, 1980
INVENTOR(S) : Katsuhiko Tsunefuji, et al It is certified that error appears in the above—identified patent and that said Letters Patent is hereby corrected as shown below:

Column 1, line 59, change "means" to --member--.

Column 3, line 41, change "perpsective" to --perspective--.

Column 5, line 21, change "31" to --41--.

Column 5, line 32, change "in" (second occurrence) to --with--.

Column 6, line 15, change "portions" to --portion--.

Column 13, line 12, change "P23" to --R23--.

Signed and Sealed this

Nineteenth Day of May 1981

[SEAL]

Attest:

RENE D. TEGTMEYER

Attesting Officer

Acting Commissioner of Patents and Trademarks